Aug. 23, 1932. R. F. SEDGLEY Re. 18,576
METHOD OF AND APPARATUS FOR MAKING COILS
Original Filed Feb. 6, 1926 4 Sheets-Sheet 1
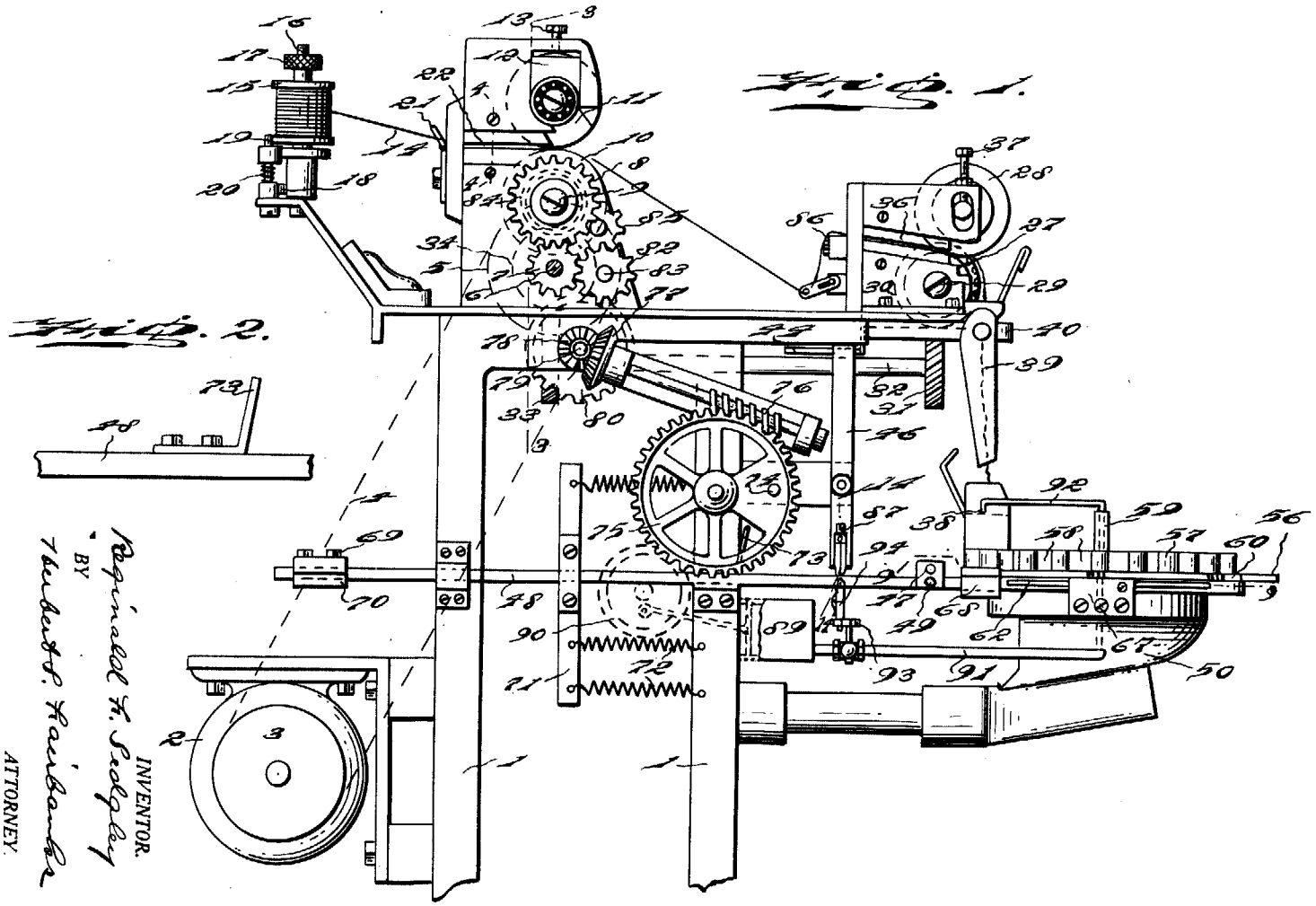
INVENTOR.
Reginald F. Sedgley
BY
Herbert S. Fairbanks
ATTORNEY.

METHOD OF AND APPARATUS FOR MAKING COILS

Original Filed Feb. 6, 1926 4 Sheets-Sheet 2

ON LINE 3-3, FIG. 1.

ON LINE 4-4 FIG. 1.

INVENTOR.
Reginald F. Sedgley
BY
Herbert S. Fairbanks
ATTORNEY.

METHOD OF AND APPARATUS FOR MAKING COILS

Original Filed Feb. 6, 1926 4 Sheets-Sheet 3

ON LINE 8-8 FIG. 9.

ON LINE 9-9 FIG. 1.

INVENTOR.
Reginald F. Sedgley
BY
Herbert S. Fairbanks
ATTORNEY.

METHOD OF AND APPARATUS FOR MAKING COILS

Original Filed Feb. 6, 1926 4 Sheets-Sheet 4

ON LINE 14-14, FIG. 1.

INVENTOR.
Reginald F. Sedgley
BY
Herbert S. Fairbanks
ATTORNEY.

Reissued Aug. 23, 1932

Re. 18,576

UNITED STATES PATENT OFFICE

REGINALD F. SEDGLEY, OF PHILADELPHIA, PENNSYLVANIA

METHOD OF AND APPARATUS FOR MAKING COILS

Original No. 1,777,900, dated October 7, 1930, Serial No. 86,480, filed February 6, 1926. Application for reissue filed February 1, 1932. Serial No. 590,280.

The object of this invention is to devise a novel method of and apparatus for making coils, wherein a continuous travel is imparted to a wire and during such continuous travel the wire is subjected first to a forming operation and thereafter to a coiling operation. The resultant product is cut into desired lengths and fed to containers which are progressively moved into receiving position. The coil in a container is subjected to a tangling operation, and the container can then be closed and is ready for shipment.

With the above and other objects in view which will hereinafter more clearly appear, my invention comprehends a novel method of and apparatus for making coils.

It further comprehends novel feeding mechanism, novel cutting mechanism, novel means for packaging the cut coils, and novel means for tangling the coils.

Other novel features of construction and advantage will hereinafter more clearly appear in the detailed description and the appended claims.

For the purpose of illustrating the invention, I have shown in the accompanying drawings a typical embodiment of it, which, in practice, will give reliable and satisfactory results. It is, however, to be understood that this embodiment is typical only, and that the various instrumentalities of which my invention consists can be variously arranged and organized, and that the invention is not, therefore, limited to the precise arrangement and organization of these instrumentalities as herein set forth.

Figure 1 is a side elevation of an apparatus for making coils, embodying my invention.

Figure 2 is a side elevation of parts shown in Figure 1.

Similar numerals of reference indicate corresponding parts.

Referring to the drawings:—

Figure 3:
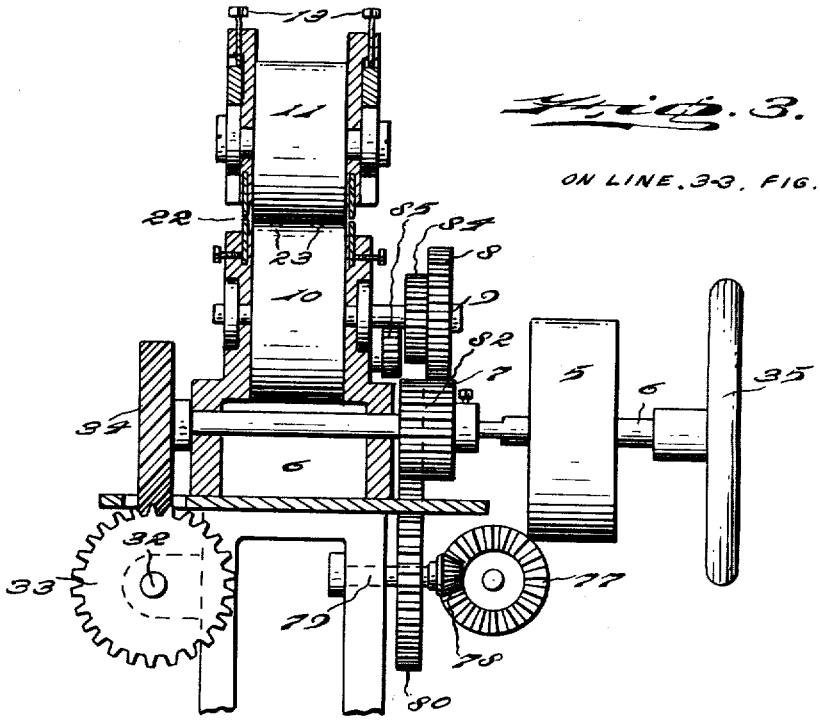
Figure 3 is a section on line 3—3 of Figure 1.
Figure 4:
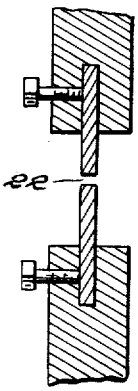
Figure 4 is a section on line 4—4 of Figure 1.
Figure 5:
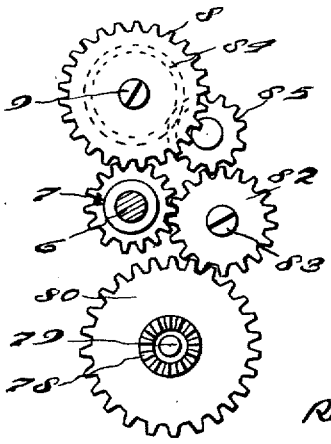
Figure 5 is an end elevation illustrating a portion of the gearing.
Figure 6:
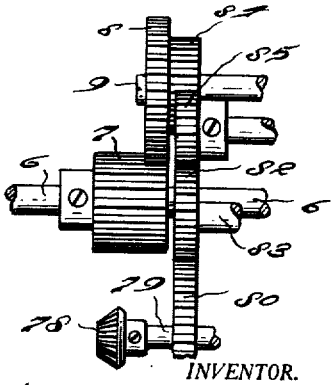
Figure 6 is a side elevation of the construction seen in Figure 5.
Figure 7:
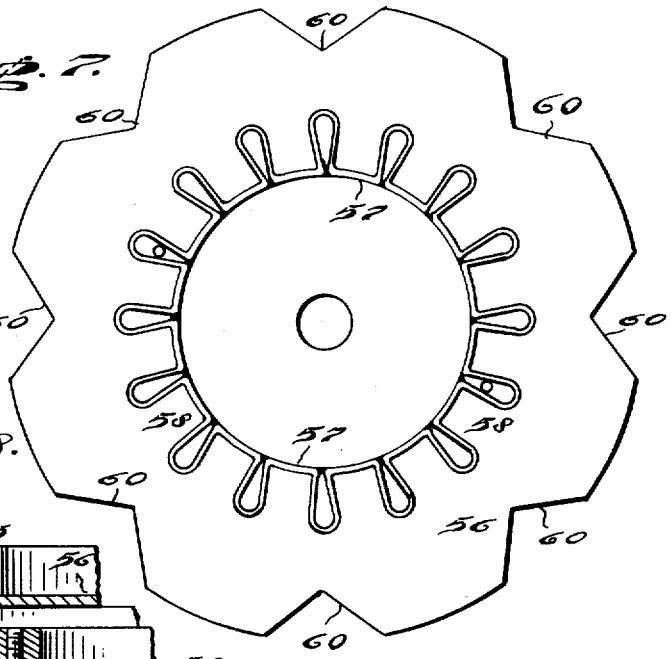
Figure 7 is a top plan view of a portion of the package feeding mechanism.

1 designates the frame of the machine, the construction and arrangement of which may vary widely in practice.

The machine is driven by a motor 2, which is preferably an electric motor carried by the frame and having a pulley 3 around which passes a belt 4, which also passes around a pulley 5 mounted on a shaft 6 suitably journalled in the frame. The shaft 6 has fixed to it a gear 7 which meshes with a gear 8 fixed to a shaft 9 journalled in the frame. The shaft 9 carries a roll 10, and a roll 11 is in rolling contact with the roll 10. The roll 11 is mounted on ball bearing journals 12 having adjusting screws 13 to regulate the pressure. The rolls 10 and 11 are forming rolls for the material 14 which may be in the form of a wire. This wire is wound on spools 15 carried by stationary spindles 16 and retained by nuts 17.

A tension device is provided for each spool consisting of an arm 18 loosely mounted on a pin 19, and springs 20 are provided which tend to move the arms 18 into contact with a portion of the spools. The wire 14 passes to the forming rolls 10 and 11 through a guide 21. The side plate of the head of the forming mechanism is made in section to provide a slot or side opening 22 so that the wire 14 can be moved through such slot into engagement with the forming rolls. The wire, after passing between the forming rolls 10 and 11, is in the form of a thin ribbon or band as shown at 23, see Figure 11.

Figures 10, 11, 12, 13, 14:
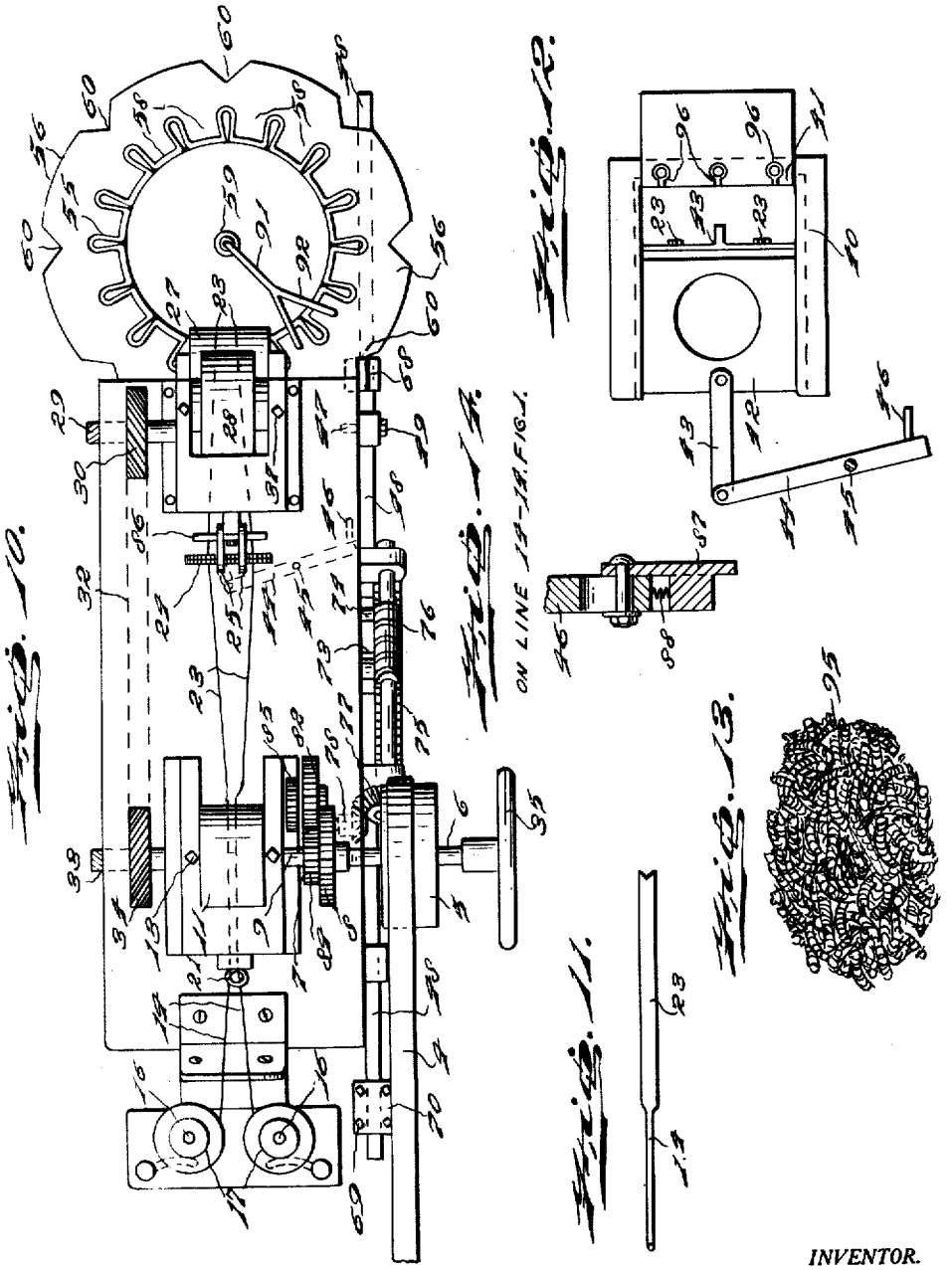
Figure 10 is a top plan view of the machine.
Figure 11 is a plan view of the wire to show the manner in which it is flattened.
Figure 12 is a top plan view of the cutting mechanism.
Figure 13 is a perspective view of the finished product.
Figure 14 is a section on line 14—14 of Figure 1.

The formed wires next pass around a stationary grooved rod 24, see Figure 10, carried by a slotted arm 25 adjustably secured to a boss on the frame by a suitable fastening device passing through the slot in the arm. The passing of the wire around the rod 24 over a bar or blade 86 causes it to assume the form of a coil as soon as it leaves the take up rolls 27 and 28. The diameter of the coil depends on the position of the rod 24 relatively to the blade 86.

The feed roll is a driving roll and is mounted on ball bearings on a shaft 29 which carries a gear 30, see Figure 10, which meshes with a gear 31, see Figure 3, fixed to a shaft 32 journalled on the frame and having a gear 33, see Figure 3, which is driven by a gear 34 on the shaft 6. This shaft 6 has a hand wheel 35.

The feed roll 28 has its outer portion of hard rubber, while the roll 27 is of metal.

The side of the head of the frame of the feed rolls is slotted as at 36, see Figure 1, so that the formed band can be brought into engagement with the take up rolls 27 and 28. The upper roll 28 has its journals adjustable by adjusting screws 37.

The wire, in the form of a continuous helix or coil, is fed into packages or boxes 38, passing down the guide chute 39 which has a separate channel for each coil.

The coils are now cut to form predetermined lengths by cutting mechanism which is accurately timed.

The cutting mechanism has a guide frame 40 carried by the frame, see Figure 12, to the front of which is fixed a stationary blade 41. A blade 42 is slidably mounted in the guide frame and has a cutting edge 43.

This cutting blade 42 has connected with it, one end of a link 43, the opposite end of which is connected to a lever 44 fulcrumed at 45 on the frame and controlled by a lever. The lower end of the lever 46 has guided in it for limited vertical movement a plunger 47 which is moved downwardly by a spring 88 and has its bottom rounded. This lever 46 is fulcrumed on the machine frame and the plunger 87 is in the path of a stud 47 adjustably secured to a slide bar 48 by means of a bolt 49, see Figure 9. This bar 48 controls both the cutting mechanism and the package feeding mechanism, and is, in turn, controlled by a timing mechanism which will be hereinafter described.

Figure 8:
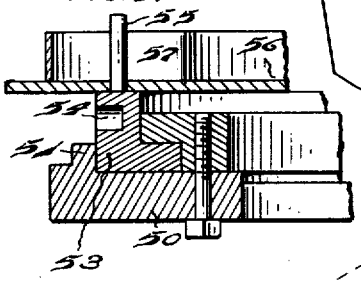
Figure 8 is a section on line 8—8 of Figure 9.

The frame has connected with it a support 50, see Figures 1 and 8, having a shoulder 51 on its upper face between which and a guide ring 52 is mounted a revoluble ring 53 having in its outer periphery circumferentially spaced recesses 54. The ring 53 has upwardly extending pins 55 which pass through a package carrying plate 56 and serve to position a spring band 57 which is bent to form a series of circumferentially spaced pockets 58 which receive the packages 38 which are in the form of cartons or boxes.

The guide ring 52 has a spider, the hub of which is recessed to receive the hollow stud 59 which extends upwardly through the plate 56. The plate 56 has in its periphery circumferentially spaced notches or recesses 60.

Figure 9:
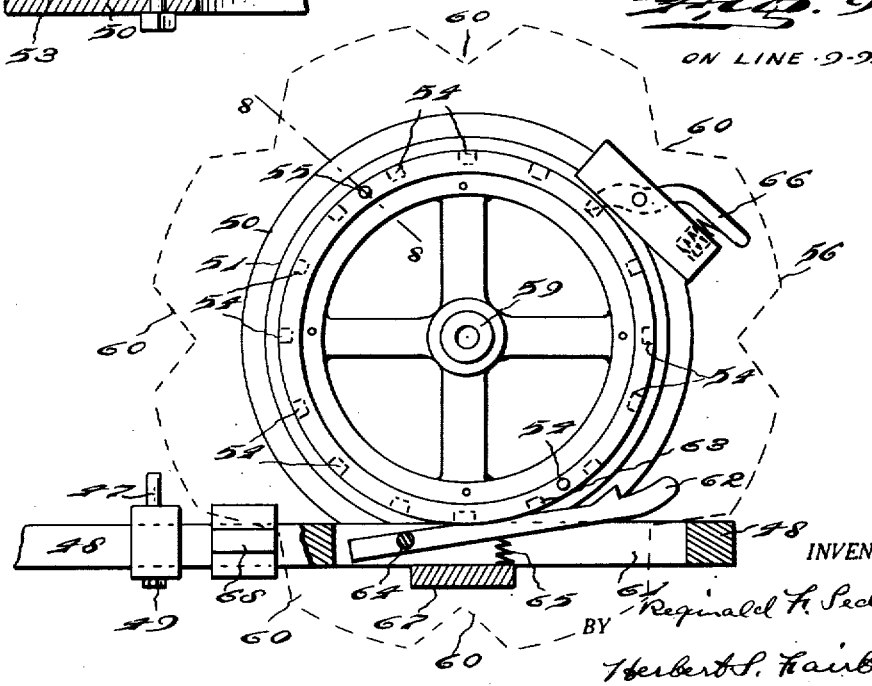
Figure 9 is a sectional plan view of the package feeding mechanism, the section being taken on line 9—9 of Figure 1.

The slide bar 48 is cut out, as at 61, see Figure 9, to receive a pawl 62 having teeth 63. This pawl 62 is pivoted to the rod 48 at 64 and a spring 65 tends to move the pawl towards the revoluble ring 53, which latter is partially revolved when the slide rod 48 is moved forwardly. The forward end of the pawl 62 is curved or bent inwardly to form a cam face.

A spring actuated detent pawl 66 is adapted to enter the recesses 54 and prevents the rotation of the ring 53 in a reverse direction. The forward end of the slide rod 48 travels in a guide 67, and is provided with an adjustable stop 68 adapted to enter a recess 60 and serve as a stop member for the plate 56. The slide bar 48 is guided on the frame, and has adjustably fixed to it, by fastening devices 69, a stop 70 which limits the forward travel of the slide bar. A bar 71 is fixed to the bar 48 and has connected to it a desired number of springs 72 which are connected to the frame so that the tendency of the springs is to advance the bar 48. This bar 48 has fixed to it a contact member 73, see Figures 1 and 2, which is in the form of an angle and is in the path of a pin 74 carried by a worm wheel 75. This worm wheel 75 is driven by a worm 76, the shaft of which is provided with a gear 77 meshing with a gear 78 on a shaft 79 journalled on the machine frame. The shaft 79 has fixed to it a gear 80, see Figures 1 and 3, which meshes with a gear 82 on a shaft 83. The gear 83 meshes with the gear 7 on the driving shaft 6. The gear 7 as shown in Figure 3 is a double gear which can be moved into or out of mesh with the gear 8 or with a gear 84 on the shaft 9. This gear 84 meshes with a gear 85 suitably mounted and meshing with the gear 82.

If the continuous length of coil fed into a carton is to be used as an abrasive or polishing material it is advantageous to tangle it, and I automatically accomplish this result by compressed air injected into a coil containing carton. The compressed air may come from any desired source of supply, which, preferably, is produced by the machine itself.

The air compressor may be in the form of a standard type of a single piston reciprocating compressor 89 driven from the gear 75 by a gear 90. A conduit 91 leads from the compression chamber of the compressor through the hollow stud 59 to a plurality of diverging nozzles 92, the discharge ends of which are above a pair of filled cartons. The conduit 91 has a four way valve 93 of conventional construction controlled by an arm 94 on the slide bar 48. The finished product in a tangled condition is shown at 95, see Figure 13.

The operation will now be apparent to those skilled in this art and is as follows:—

Assuming first that it is desired to form coils from a wire or strip of material having any desired contour in cross-section and that it is to be subjected to a forming or flattening operation before being coiled, the wire, wound on spools 15, are placed on the spindles 16.

The machine is adapted to carry a desired number of spools so that a plurality of individual coils are simultaneously formed from strips of material, and, for the purpose of illustration, I have shown a plurality of spools. The wire 14 from each spool is threaded through the guide 21 and is then passed through the slot 22, see Figure 1, so that the two wires will be received between the flattening rolls 10 and 11. For this purpose, the hand wheel 35 is actuated to bring the wire between the flattening rolls. The wire is then drawn forwardly and passed under the rod 24 which is preferably provided with annular guide grooves. The wire is then drawn upwardly over the plate 86 and is threaded through the slot 36 of the frame into contact with the take up rolls 27 and 28. The packages or cartons 38 are placed in pockets 58, the flaps being in their open position.

The belt 4 passes around the pulley 3 and also around the pulley 5 fixed to the drive shaft 6, so that the drive shaft 6 is now revolving.

Assuming that the parts are in the position shown in Figure 1, the gear 7, fixed to the drive shaft 6, meshes with the gear 8 fixed to the shaft 9 so that the lower flattening roll 10 will be driven, and, as the upper flattening roll is in contact with the roll 10, the second roll will be driven, thereby forming or flattening the wire or strip of material. At the same time, the feed rolls 27 and 28 are driven, and, since the gear 34 on the driving shaft 6 meshes with the gear 33 on the shaft 32, the latter shaft is driven together with its gear 31, see Figure 1. The gear 31 meshes with the gear 30, see Figure 10, on the shaft 29 of the lower feed roll 27. The upper feed roll 28 has its contact portion of less density or is made of hard rubber, and is in rolling contact with the lower feed roll 27, so that the two feed rolls 27 and 28 will be driven, thereby effecting the forward feed of the wire.

The operator now starts the motor 2, and, as the wire 14 passes from the flattening rolls 10 and 11, it is in the form of a thin band or ribbon 23, as will be understood from Figure 11.

This flat or other form of band passes beneath the rod 24 which is carried by a bracket 25 which is adjustably supported. The purpose of this adjustment is to enable one to make coils of different diameters. The diameter of the coils depends on the angular relation of the blade 86 and the rod 24. It will be understood that the wire is under tension so that as it passes around the rod 24 and over the blade 86, coiling action is effected. It will be seen that the bracket 25 due to the slot and pin connection 26 is capable of a universal adjustment, so that the machine can be adjusted to make coils of different diameters.

Assuming that the machine is continuously running, the strips in the form of a coil pass down the guide chute 39, which is provided with a plurality of channels so that each separate coil is discharged into a separate carton 38.

I provide means for cutting the coils into predetermined lengths or weights to be received in a carton 38, and for controlling the cutting mechanism I employ a timing mechanism.

In the operation just described, the timing is accomplished by the gear 82 which meshes with the gear 7 and also with the gear 80, which latter is mounted on the shaft 79, the shaft of which carries the gear 78.

This gear 78 drives the gear 77 and thereby the worm 76, thus revolving the worm wheel 75. The worm wheel 75 is provided with a pin 74 which travels in the path of a contact member 73 on the slide bar 48, and, assuming that the gear 75 is traveling in a clockwise direction, see Figure 1, the pin 74 cooperating with the contact member 73 will cause the slide bar 48 to be moved rearwardly, thereby increasing the tension of the springs 72 until the pin 74 passes out of engagement with the contact member 73.

The slide bar 48 is moved forwardly by the springs 72, and the pin 47 carried by said bar strikes the plunger 87, see Figure 1, thus rocking the lever 46 of the cutting mechanism, see Figure 1, and actuating the lever 44, see Figure 12, to effect the forward cutting stroke of the movable knife 42, so that its cutting edge 43 will cut the coiled bands 23. The edge 43 will cut the coiled bands 23. The forward movement of the slide bar 48 also causes the step by step advance of the plate 56 which forms a table to support the cartons.

As the slide bar 48 moves forwardly the teeth 63 on the pawl 64 enter the recesses 54 of the rotatable ring 53 and causes the latter to advance two steps so that the two boxes which have been filled will be moved out of filling position and the next two boxes or cartons will be brought into filling position.

The slide bar 48 is provided with a stop 70 which limits the forward movement of the slide bar 48 and prevents any overrun of the plate or carton carrier 46.

The rearward movement of the plate 56 is prevented by the detent 66. When the slide bar 48 reaches the forward end of its forward movement, the stop 68 on the bar enters a notch or recess 60 so that, during the filling of the cartons they will be accurately positioned beneath the channels in the guide chute 39.

It will be apparent from the foregoing that all that the operator has to do is to see that the machine is supplied with spools of material, and to keep the pockets 58 filled with cartons, and to remove the filled cartons, and the entire operation of the machine is automatic.

I provide means for effecting the tangling of each length of coil which has been fed through a carton before the carton carrier 56 is advanced. This can be accomplished in any desired manner, but for purpose of illustration, I have shown the worm wheel 75 meshing with a worm gear 90 which actuates an air compressor 89 of any conventional construction, thereby creating a source of compressed air. The conduit 91 leads from the compression channel of the compressor through the hollow stud 59 to the air nozzles 92 the discharge ends of which are positioned above the two cartons which have been filled, and the discharge ends of these nozzles are bent so that the air will be discharged into the cartons to cause a whirling action and thereby the entanglement of the different portions of the coils. As the carton carrier is advanced the nozzles close one side flap of the cartons with which they are cooperating.

The passage of the compressed air to the nozzles is controlled by the arm 94 on the slide bar 48, so that the valve 93 is given a quarter turn which effects the opening and closing of the valve to cause a puff of compressed air to pass through each nozzle into its carton. The carton carrier 56 is now advanced, and the operator closes the package so that the carton is now in condition for shipment.

It is advisable in a machine of this character to have the timing mechanism so adjusted that different weights or lengths of the material can be fed into the cartons, and, for this purpose, I provide the idler 85, so that when the gear 75 is moved outwardly the timing will be done through the gear 7, gear 84, gear 85, gear 82 and gear 80 which enables a greater weight or a greater amount of material to be discharged into a carton.

It will, of course, be apparent that it is within the scope of this invention to form coils from lengths of material without subjecting the material to a flattening operation. A flat sheet or band may be employed in lieu of a wire which is not in the form of a band. In such case, the pressure between the rolls 10 and 11 is reduced, and the material is fed in the same manner as already described, the only difference being that the strip of material from which the coils are formed is not subjected to a flattening operation.

When the slide bar 48 is moved rearwardly, the pin 47 causes the spring pressed plunger 47 to be moved upwardly without operating the lever 46. The forward end of the pawl 62 is in the form of a cam so that, when the slide bar 48 is moved rearwardly, the teeth 63 are cammed out of engagement with the rotatable ring 53 which operates the carton carrier 56. If the coils are tangled, the material 95 is adapted to be used for abrasive or polishing but, in case it is not desired to use it for an abrasive or polishing, the tangling operation can be dispensed. When an abrasive or polishing material or article is to be made, the wire or band from which it is formed is preferably of a non-corrosive nature, and a material such as nickel steel wire may be used. It will be apparent from the foregoing that in accordance with this invention a metal strand is fed under tension and while it is under tension it is passed over a curling edge. The passing of the metal strand over the curling edge works one side of the metal so that the opposite side or surface is stretched. The results of this is that as soon as the tension is released the metal strand automatically assumes the form of a helical coil. This is formed into a flexible and resilient metallic bunch with the juxtaposed coils interlocking and tending to main tain the bunch formation.

If it is desired to form coil springs it will be apparent that the strip may be made of spring or other metal which may or may not be subjected to a forming operation, and continuous lengths of coiled springs can be continuously and automatically formed.

The cutting mechanism is so arranged that a shear cut is made and the fastening devices which secure the fixed blade 41 in position also secure in position springs 96 which tend to move downwardly the marginal edge portion adjoining the cutting edge so that the blades are self sharpening.

The driving means for the different sets of rolls is such that the driven take up roll is driven at a greater speed than that of the driven roll of the set of forming rolls. This serves as a take up roll for the wire or band which is being fed and compensates for any stretch of the material during the operation.

It will be apparent that my present invention is also adapted to be employed for winding the material on spools, in which case the wire or other material can pass directly from the set of forming rolls to the seat of take up rolls.

If a take up roll becomes worn the operator can move the strip of material 23 to an adjoining groove on the rod 24 so that a fresh surface of the take up roll will cooperate with the strip.

For purpose of illustration, I have shown the forming rolls as arranged to roll a flat strip, but it is within the scope of my invention to have the strip which is formed by the forming rolls 10 and 11 of any desired contour in cross section, for example, the shape may be diamond shaped, oblong, or formed in such a manner that in cross section it will have any desired number of abrasive edges, and the contours in cross section which can be formed are too numerous to herein specifically mention. It will be apparent from the disclosure herein that by the term "coiling operation" and means to effect the coiling of the strip of material that the action on the strip is such as to impart to the strip an inherent tendency to curl when released from tension.

It will now be apparent that I have devised a new and useful method of an apparatus for making coils which embodies the features of advantage enumerated as desirable in the statement of the invention and the above description, and that while I have, in the present instance, shown and described a preferred embodiment thereof which will give, in practice, satisfactory and reliable results, it is to be understood that this embodiment is susceptible of modification in various particulars without departing from the spirit or scope of the invention or sacrificing any of its advantages.

Having thus described my invention what I claim as new and desire to secure by Letters Patent, is:

1. The method of making coils consisting in continuously feeding a strip of material and during such feed subjecting it to a forming operation to vary its form in cross section, then to a coiling operation, and mechanically cutting off predetermined lengths of coils in timed relation with the forming and coiling operations.

2. The method of making coils which consist in continuously feeding a strip of material, and during such feeding subjecting it to a forming operation to vary its form in cross section and a coiling operation, feeding cartons into receiving position, discharging the coil strip into cartons and severing the strip into predetermined lengths of coils after it has been fed into cartons.

3. The method of forming coils, which consists in coiling a strip of material, feeding it into a container, and then injecting fluid into said container to effect the tangling of the coil.

4. In a coil making machine, means to feed a strip of material, means to coil the material, means to feed a container into position to receive the coiled material, and mechanically operated means to cut the coiled material into predetermined lengths.

5. In a coil making machine, means to feed a strip of material, means to coil the material, means to feed a container into position to receive the coiled material, means to cut the coiled material into predetermined lengths, and means to tangle the coiled material into a bunch.

6. In a coil making machine, means to feed a strip of material, means to form the strip to vary its contour in cross section, means to effect the coiling of the formed strip and means mechanically operated in timed relation with the forming and coiling means to cut the coiled strips into predetermined lengths.

7. In a coil making machine, means to feed a strip of material, means to form the strip, means to effect the coiling of the formed strip, means to cut the coiled strips into predetermined lengths, means to feed container into position to receive the cut coils, and means to tangle the cut coils into bunches.

8. In a coil making machine, means to feed a strip of material, a member around which the strip passes, a blade to which the strip passes under tension from said member, and means to relatively adjust said member and blade to determine the diameter of the coil produced.

9. In a coil making machine, a set of rolls to receive the strip of material to be treated, coiling mechanism to which the strip passes, a second set of rolls to which the strip passes and having one of its rolls of less density than the other, and driving means for said sets.

10. In a coil making machine, a set of forming rolls, a set of take up rolls, coiling mechanism to which the material passes from said forming rolls and which passes from the coiling mechanism to said take up rolls, and actuating means for said rolls.

11. In a coil making machine means to feed a strip of material, means to effect the coiling of the strip, cutting-off mechanism, adjustable timing mechanism to control said cutting-off mechanism, and actuating means for said feeding means and said mechanism.

12. In a coil making machine, a strip feeding mechanism, strip coiling mechanism, means to progressively feed separate containers into position to receive the coiled strip, cutting off mechanism to sever the strip, timing mechanism for said cutting off mechanism and said container feeding mechanism, and means co-operating with said mechanism and said means to effect the cyclical operation of the machine.

13. In a coil making machine, a set of co-operating forming rolls, means to drive one of said forming rolls, a set of take up rolls, coiling mechanism between said sets, and means to drive one of said take up rolls at a different speed from that of the driven forming roll.

14. In a strip treating machine, a set of co-operating forming rolls, means to drive one of said forming rolls, a set of take up rolls, coiling mechanism between said sets of rolls and means to drive one of said take up rolls at a greater speed than the driven speed of said driven forming roll.

15. In a coiling machine, a set of forming rolls, means to drive one of said rolls, which frictionally drives the other roll of the set, coiling mechanism to which the material being treated passes from said set, a set of take up rolls, each being of a different degree of hardness than the other and to which the material being treated passes from said coiling mechanism, and means to drive one of said take up rolls and thereby cause it to drive the other take up roll.

16. In a coiling machine, spools for the material to be treated, tension means for said spools, a set of feeding rolls to which the material passes from said spools, coiling mechanism to which the material passes from said feeding rolls, a second set of rolls to which the material passes from said coiling mechanism, means to effect the drive of said sets of rolls, and means to intermittently cut the coiled material passing from said second set of rolls.

17. In a rolling machine, a frame having a roll carrying head with an upper and a lower cooperating roll and with the head open throughout its length at both sides to provide for the material being treated being passed laterally through said opening into engagement with the rolls, and means to revolve the rolls.

18. In a rolling machine, a plurality of sets of upper and lower cooperating rolls, a head for each set, each head having both sides open so that the material being rolled can be threaded into engagement with the rolls of each set, and actuating means for said rolls.

19. The method of making curled wire which comprises rolling wire to flatten it, maintaining the flattened wire while moving under tension, and causing the flattened wire while moving and under tension to pass over a curling edge which imparts to the wire an inherent tendency to curl.

20. The method of making curled wire which comprises passing wire continuously between rolls thereby flattening the wire, feeding the flattened wire continuously between feed rolls whereby the flattened wire is maintained under tension, and causing the tensioned flattened wire, while maintained under tension and moving continuously, to pass over a curling edge thereby imparting to it an inherent tendency to curl.

21. The method of making curled wire which comprises flattening wire while moving continuously, imparting to the flattened wire, while moving continously, an inherent tendency to curl, maintaining the flattened wire under tension, thereby preventing curling thereof, and then relieving the wire of tension thereby permitting it to curl.

22. A machine for making curled wire comprising rolls operative to flatten wire, feed rolls operative to advance the flattened wire continuously and to maintain the flattened wire under tension, and means operative on the continuously advancing flattened wire under tension to impart to it an inherent tendency to curl.

23. A machine for making curled wire comprising continuously revolving rolls operative to flatten wire, a curling edge, and means for drawing the flattened wire over said curling edge and for maintaining the wire under tension.

24. A machine for making curled wire comprising rolls adapted to receive wire between them and operative to flatten said wire, feed rolls adapted to receive the flattened wire between them and operative to advance said wire and to maintain it under tension, and means arranged to act on the tensioned wire to impart to it a tendency to curl.

25. A machine for making curled wire comprising a pair of wire flattening rolls, a pair of feed rolls adapted to draw the flattened wire between them, means for driving said pairs of rolls at a relative speed which will maintain the flattened wire under tension, and curling means arranged to act on the tensioned flattened wire.

26. A machine for making curled wire comprising a wire curling member, continuously running means for advancing the wire, means for maintaining the wire under tension while passing said curling member and for freeing it of tension after passing said curling member, and intermittently operative container-filling means for the tension-freed curled wire.

27. A machine for making curled wire comprising continuously running means for feeding and tensioning wire, means for imparting a curling tendency to the wire, means for filling the curled wire, freed of tension, into containers, and means governed by the feeding means for controlling the operation of the filling means.

28. The method of making a metal strand in the form of a helical coil, which consists in feeding a metal strand under tension, continuously working the metal at one side of the strand while it is under tension to stretch the opposite side of the strand, thereby causing said strand when released from tension to assume the form of a helical coil.

29. The method of making a metal strand in the form of a helical coil, which consists in feeding a metal strand under tension, and, while it is under tension, passing it over a curling edge to impart to it an inherent tendency to form a helical coil when released from tension, and releasing the strand thus treated from tension to permit it to assume the form of a helical coil.

30. A machine for making a metal strand in the form of a helical coil, comprising means for feeding and tensioning a metal strand, and means to stretch the metal at one side of the strand while it is under tension to cause the metal strand when released from tension to assume the form of a helical coil.

31. A machine for making a metal strand in the form of a helical coil, comprising means for feeding and tensioning a metal strand, and a curling edge over which said strand is fed while under tension to cause the metal strand when released from tension to assume the form of a helical coil.

Philadelphia, Pa., January 23, 1932.

REGINALD F. SEDGLEY.

DISCLAIMER

Re. 18,576.—*Reginald F. Sedgley*, Philadelphia, Pa. METHOD OF AND APPARATUS FOR MAKING COILS. Patent dated August 23, 1932. Disclaimer filed January 31, 1935, by the patentee.

Hereby enters this disclaimer to claims 28 and 30 which read as follows:

"28. The method of making a metal strand in the form of a helical coil, which consists in feeding a metal strand under tension, continuously working the metal at one side of the strand while it is under tension to stretch the opposite side of the strand thereby causing said strand when released from tension to assume the form of a helical coil."

"30. A machine for making a metal strand in the form of a helical coil, comprising means for feeding and tensioning a metal strand, and means to stretch the metal at one side of the strand while it is under tension to cause the metal strand when released from tension to assume the form of a helical coil."

[*Official Gazette February 26, 1935.*]